United States Patent
Gremmelspacher et al.

(10) Patent No.: US 12,195,388 B2
(45) Date of Patent: Jan. 14, 2025

(54) DEVICE COMPRISING A FURNACE AND METHOD FOR THE USE THEREOF

(71) Applicant: Fraunhofer-Gesellschaft zur Förderung der angewandten Forschung e.V., Munich (DE)

(72) Inventors: Matthias Gremmelspacher, Freiburg (DE); Tobias Rist, Freiburg (DE); Rainer Kübler, Freiburg (DE); Britta Lang, Freiburg (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 730 days.

(21) Appl. No.: 17/018,163

(22) Filed: Sep. 11, 2020

(65) Prior Publication Data
US 2021/0002169 A1    Jan. 7, 2021

Related U.S. Application Data

(63) Continuation of application No. PCT/EP2019/056237, filed on Mar. 13, 2019.

(30) Foreign Application Priority Data

Mar. 23, 2018 (DE) .............. 10 2018 204 476.7

(51) Int. Cl.
C03C 23/00 (2006.01)
C03C 19/00 (2006.01)
F27B 17/00 (2006.01)
F27D 5/00 (2006.01)
F27D 99/00 (2010.01)

(52) U.S. Cl.
CPC .......... *C03C 23/0025* (2013.01); *C03C 19/00* (2013.01); *F27B 17/0083* (2013.01); *F27D 5/0025* (2013.01); *F27D 99/0075* (2013.01)

(58) Field of Classification Search
None
See application file for complete search history.

(56) References Cited

U.S. PATENT DOCUMENTS 242,549 A * 7/1881 McCord
4,755,204 A   7/1988 Boardman et al.
(Continued)

FOREIGN PATENT DOCUMENTS

CN    201971859 U  *  9/2011
CN    104275782        1/2015
(Continued)

OTHER PUBLICATIONS

JP61213324A—Clarivate Analytics Machine Translation Performed May 19, 2023. (Year: 2023).*
(Continued)

*Primary Examiner* — Lisa L Herring
(74) *Attorney, Agent, or Firm* — Womble Bond Dickinson (US) LLP (57) ABSTRACT

A furnace (2) has at least one furnace chamber (20) delimited by a wall (25); at least one opening (5) is provided in the wall (25). The opening is provided with at least one nozzle (50), configured to generate a sealing air flow. A glass semi-finished product (4) can be introduced into the furnace chamber.

24 Claims, 7 Drawing Sheets

(56) References Cited

U.S. PATENT DOCUMENTS

| | | | |
|---|---|---|---|
| 4,883,563 A | | 11/1989 | Kotani et al. |
| 4,891,055 A | | 1/1990 | Shibaoka et al. |
| 5,148,714 A | * | 9/1992 | McDiarmid ........ C23C 16/4584 |
| | | | 219/390 |
| 9,573,832 B2 | | 2/2017 | Gaylo |
| 2006/0230790 A1 | | 10/2006 | Yli-Vakkuri |
| 2010/0024485 A1 | * | 2/2010 | Duerk .................... C03B 35/04 |
| | | | 65/181 |
| 2010/0129602 A1 | * | 5/2010 | Dejneka ............... C03B 11/122 |
| | | | 65/106 |
| 2013/0153551 A1 | | 6/2013 | Dear |
| 2014/0113237 A1 | * | 4/2014 | Rohner .................... F27B 5/18 |
| | | | 219/390 |
| 2014/0203482 A1 | * | 7/2014 | Blumenau ........... C21D 9/0056 |
| | | | 266/252 |
| 2018/0237325 A1 | * | 8/2018 | Li ............................ C03B 17/02 |
| 2019/0152832 A1 | * | 5/2019 | Xu ........................ C03B 27/012 |
| 2021/0002169 A1 | | 1/2021 | Gremmelspacher et al. |
| 2021/0188689 A1 | * | 6/2021 | Bjørgum ............... C03B 35/005 |

FOREIGN PATENT DOCUMENTS

| | | | |
|---|---|---|---|
| CN | 206266656 U | * | 6/2017 |
| GB | 813107 | | 5/1959 |
| JP | S54167828 U | | 11/1979 |
| JP | 61213324 A | * | 9/1986 |
| JP | S62246833 A | | 10/1987 |
| JP | S63138255 A | | 6/1988 |
| JP | S63139021 A | | 6/1988 |
| JP | H053894 U | | 1/1993 |
| JP | 2003-275575 | | 9/2003 |
| JP | 2006287228 A | * | 10/2006 ........... B08B 7/0035 |
| JP | 2009-078947 | | 4/2009 |
| JP | 2011-16678 A | | 1/2011 |
| KR | 2005-0024229 | | 3/2005 |
| KR | 2016-0077135 A | | 7/2016 |
| KR | 2016-0097054 | | 8/2016 |
| KR | 2017-0000467 A | | 1/2017 |
| KR | 10-1804393 | | 12/2017 |

OTHER PUBLICATIONS

CN-206266656-U Clarivate Analytics Machine Translation Performed May 19, 2023. (Year: 2023).*

CN-201971859-U Clarivate Analytics Machine Translation Performed May 20, 2023. (Year: 2023).*

JP-2006287228-A Machine Translation Clarivate Analytics Retreived Nov. 20, 2023. (Year: 2023).*

JPS61213324A EPO Machine Translation Retrieved May 3, 2024. (Year: 2024).*

International Search Report dated Jun. 26, 2019, issued in PCT counterpart application (No. PCT/EP2019/056237), including translation.

Written Opinion dated Jun. 26, 2019, issued in PCT counterpart application (No. PCT/EP2019/056237), including translation.

Wikipedia, "continuous furnace," https://de.wikipedia.org/w/index.php?title=Conveyoroven&oldid=221100462, last edited Mar. 14, 2022, retrieved Apr. 27, 2023.

Office Action issued Sep. 21, 2023 in counterpart application No. KR 10-2020-7027016.

* cited by examiner

DEVICE COMPRISING A FURNACE AND METHOD FOR THE USE THEREOF

RELATED APPLICATIONS

The present application is a Bypass Continuation of International Application No. PCT/EP2019/056237, filed Mar. 13, 2019, which claims priority to German Patent Application No. 10 2018 204 476.7, filed Mar. 23, 2018. The contents of the aforementioned applications are incorporated by reference in their entirety.

FIELD OF THE INVENTION

The invention relates to a device comprising a furnace having at least one furnace chamber which is delimited by a wall and into which a semi-finished glass product may be introduced. The invention also relates to a method for re-shaping semi-finished glass products.

BACKGROUND

It is known in the art to introduce semi-finished glass products into a furnace where they are heated and thus re-shaped. For example, vehicle windows or bent architectural glass may be manufactured in this way. It is also known to additionally heat locally the semi-finished glass product in the furnace with a radiation source so as to gain greater control over the shaping process.

A disadvantage of these known devices and methods is the long cycle time of the shaping process due to slow heating and cooling of the semi-finished glass product. In some embodiments, it is therefore an object of the invention to provide a device and a method for re-shaping a semi-finished glass product, which allow shorter cycle times and/or improved control over the re-shaping process.

SUMMARY

According to the invention, this object is solved by a device according to claim 1 and a method according to claim 20. Advantageous improvements of the invention are described in the dependent claims.

According to the invention, a device is disclosed having a furnace comprising at least one furnace chamber that is delimited by a wall. While performing the method, a semi-finished glass product is introduced into this furnace chamber and heated. In some embodiments of the invention, the heating may be carried out by convection and radiation until the semi-finished glass product has a sufficiently low viscosity and is re-shaped freely or in a mold under the influence of gravity. In other embodiments of the invention, the residence time of the semi-finished glass product and/or the temperature inside the furnace chamber may be selected in such a way that the semi-finished glass product gets a higher temperature but retains a sufficient mechanical strength which initially prevents re-shaping. Then, additional heat may be supplied to predetermined partial areas of the semi-finished glass product. This heat heats the semi-finished glass product above the glass transition temperature and thus leads to local re-shaping.

The above mentioned partial areas may, for example, be heated with infrared laser radiation from a laser device. Partial areas to be irradiated may be selected, for example, by means of a lens system and/or a mask. In other embodiments of the invention, the laser device may be rotated or swiveled in order to direct the beam onto predetermined partial areas of the semi-finished glass product. In still other embodiments of the invention, the laser radiation may be directed by means of a scanner with a movable mirror onto predetermined partial areas of the semi-finished glass product. In this way, the laser beam may be controlled faster since instead of a comparatively large and heavy laser or another radiation source, only a comparatively small and light mirror has to be moved mechanically.

According to the invention, it is suggested to couple the laser beam into the furnace chamber through an opening in the furnace wall. This may have the advantage that the radiation source and/or the scanner with the movable mirror or actuators do not have to be operated at elevated temperature inside the furnace chamber.

In order to avoid a strong absorption of the laser radiation in the wall of the furnace chamber, it is suggested to design the opening in a material-free manner in the form of a simple hole.

According to the invention, it is suggested not to use a glazing or another window to cover said opening.

In some embodiments of the invention, the opening in the furnace wall may be provided with at least one gate valve adapted to temporarily close the opening. This feature may allow for reducing heat losses when no electromagnetic radiation is passed through the opening to heat the semi-finished glass product.

In some embodiments of the invention, the opening in the wall may be provided with at least one nozzle adapted to generate a sealing air flow. In particular, if the opening is arranged in the ceiling of the furnace chamber, an emission of warm air otherwise occurs since the heated air in the furnace chamber rises up and can escape as if through a chimney. The sealing air flow can counteract this convective flow and thus reduce the heat losses of the furnace chamber. Thus, undesired heating of the space surrounding the furnace may be avoided. Additionally, the risk of destruction of the laser and/or the scanner is avoided or reduced because the temperature above the opening is reduced. Finally, the energy consumption for heating the furnace chamber may be reduced. Furthermore, in some embodiments of the invention, the temperature distribution within the furnace chamber may be more homogeneous, so that the quality of the semi-finished glass product re-shaped in the device according to the invention may be improved.

In some embodiments, the invention relates to a device wherein the nozzle adapted to generate a sealing air flow is designed as a ring nozzle. In some embodiments of the invention, the sealing air flow may comprise an inert gas.

In some embodiments, the invention relates to a device wherein the furnace has a plurality of furnace chambers which are configured to be passed through sequentially by the semi-finished glass product, wherein each furnace chamber may have a different temperature.

In some embodiments, the invention relates to a device substantially as described and comprising further at least one infrared camera configured to determine the temperature distribution of the semi-finished glass product. The infrared camera may be arranged in line with a second opening which may be equipped with a second nozzle for generating a second sealing air flow. This feature may improve measuring accuracy.

In some embodiments, the invention relates to a device substantially as described and comprising further at least one embossing die configured to re-shape the semi-finished glass product.

In some embodiments of the invention, said embossing die is arranged in a part of the furnace chamber being configured to be heated to a temperature differing from the temperature of the remaining parts of the furnace chamber.

In some embodiments, the invention relates to a device substantially as described and comprising further a complementarily shaped counter embossing die arranged opposite the at least one embossing die.

In some embodiments, the invention relates to a device substantially as described and comprising further at least one laser which is configured to generate a laser beam and to direct it onto predetermined partial areas of the semi-finished glass product.

In some embodiments, the invention relates to a device substantially as described and comprising further at least one movable mirror configured to guide the laser beam onto predetermined partial areas of the semi-finished glass product.

In some embodiments, the invention relates to a device substantially as described and comprising further a transport pallet and/or a mold having three contact points, said contact points configured to be positioned onto corresponding receiving devices of the furnace chamber in an interlocking manner.

In some embodiments of the invention, the center of gravity of the transport pallet and/or the mold is located within a triangle defined by the contact points.

In some embodiments of the invention, the contact points have a V-shaped support body and the receiving devices have a round outer cross-section.

In some embodiments of the invention, at least one receiving device is configured to receive a plurality of contact points.

In some embodiments, the invention relates to a device substantially as described and comprising further at least one air circulation system configured to circulate the air in the oven chamber.

In some embodiments, the invention relates to a device substantially as described and comprising further at least one sheet metal heat deflector which is arranged inside the furnace chamber and covers at least a part of the furnace wall that is located on the line of sight of the semi-finished glass product.

In some embodiments, the invention relates to a device substantially as described and comprising further a heating unit configured to bring at least one sheet metal heat deflector to a predetermined temperature.

In some embodiments of the invention, the air circulation system is configured to generate an air flow which flows behind at least part of a sheet metal heat deflector and/or part of the wall.

In some embodiments, the invention relates to a device substantially as described and comprising further a positioning system configured to move the semi-finished glass product within the furnace chamber along at least one axis.

In some embodiments, the invention relates to a device substantially as described and comprising further a positioning system configured to rotate the semi-finished glass product within the furnace chamber about at least one axis.

In some embodiments, the invention relates to a method for re-shaping a semi-finished glass product, by introducing the semi-finished glass product into a furnace having at least one furnace chamber delimited by a wall.

In some embodiments of the invention, the wall may have at least one opening and at least one nozzle adapted to generate a sealing air flow.

In some embodiments, the invention relates to a method for re-shaping a semi-finished glass product, wherein the furnace has a plurality of furnace chambers having different temperatures and wherein the semi-finished glass product passes through said furnace chambers sequentially.

In some embodiments, the invention relates to a method for re-shaping a semi-finished glass product, wherein the temperature distribution of the semi-finished glass product is measured by at least one infrared camera.

In some embodiments, the invention relates to a method for re-shaping a semi-finished glass product, wherein the semi-finished glass product is re-shaped by at least one embossing die.

In some embodiments, the invention relates to a method for re-shaping a semi-finished glass product, wherein the at least one embossing die is arranged in a first part of the furnace chamber having a temperature differing from the temperature of other parts of the furnace chamber.

In some embodiments, the invention relates to a method for re-shaping a semi-finished glass product, wherein a complementarily shaped counter embossing die is arranged opposite the at least one embossing die.

In some embodiments, the invention relates to a method for re-shaping a semi-finished glass product, wherein a predetermined partial area of the semi-finished glass product is heated by a laser beam generated by at least one laser.

In some embodiments, the invention relates to a method for re-shaping a semi-finished glass product, wherein the laser beam is directed onto predetermined parts of the surface of the semi-finished glass product by at least one movable mirror.

In some embodiments, the invention relates to a method for re-shaping a semi-finished glass product, wherein the semi-finished glass product is arranged on a transport pallet and/or a mold, wherein said mold and/or said transport pallet has three contact points on the side facing away from the semi-finished glass product. Said contact points are positioned onto corresponding receiving devices of the furnace chamber in an interlocking manner.

In some embodiments, the invention relates to a method for re-shaping a semi-finished glass product, wherein the center of gravity of the transport pallet and/or the mold is located within a triangle defined by the contact points.

In some embodiments, the invention relates to a method for re-shaping a semi-finished glass product, wherein the contact points have a V-shaped support body and the receiving devices have a round outer cross-section.

In some embodiments, the invention relates to a method for re-shaping a semi-finished glass product, wherein at least one receiving device receives a plurality of contact points.

In some embodiments, the invention relates to a method for re-shaping a semi-finished glass product, wherein the semi-finished glass product is introduced into a furnace having at least one air circulation system configured to circulate the air in the furnace chamber.

In some embodiments, the invention relates to a method for re-shaping a semi-finished glass product, wherein the semi-finished glass product is introduced into a furnace having at least one sheet metal heat deflector arranged inside the furnace chamber and covering at least a part of the wall located on the line of sight of the semi-finished glass product.

In some embodiments, the invention relates to a method for re-shaping a semi-finished glass product, wherein the semi-finished glass product is introduced into a furnace comprising at least one heating unit which brings at least one sheet metal heat deflector to a predetermined temperature.

In some embodiments, the invention relates to a method for re-shaping a semi-finished glass product, wherein the semi-finished glass product is introduced into a furnace and wherein an air circulation system generates an air flow that flows behind at least part of a sheet metal heat deflector and/or a part of the wall.

In some embodiments, the invention relates to a method for re-shaping a semi-finished glass product, wherein the semi-finished glass product is moved within the furnace chamber along at least one axis by at least one positioning system.

In some embodiments, the invention relates to a method for re-shaping a semi-finished glass product, wherein the semi-finished glass product is rotated within the furnace chamber about at least one axis by at least one positioning system.

BRIEF DESCRIPTION OF THE DRAWINGS

The invention shall be explained in more detail below with reference to the attached drawings without limiting the general concept of the invention, wherein.

DETAILED DESCRIPTION

Figure 1:
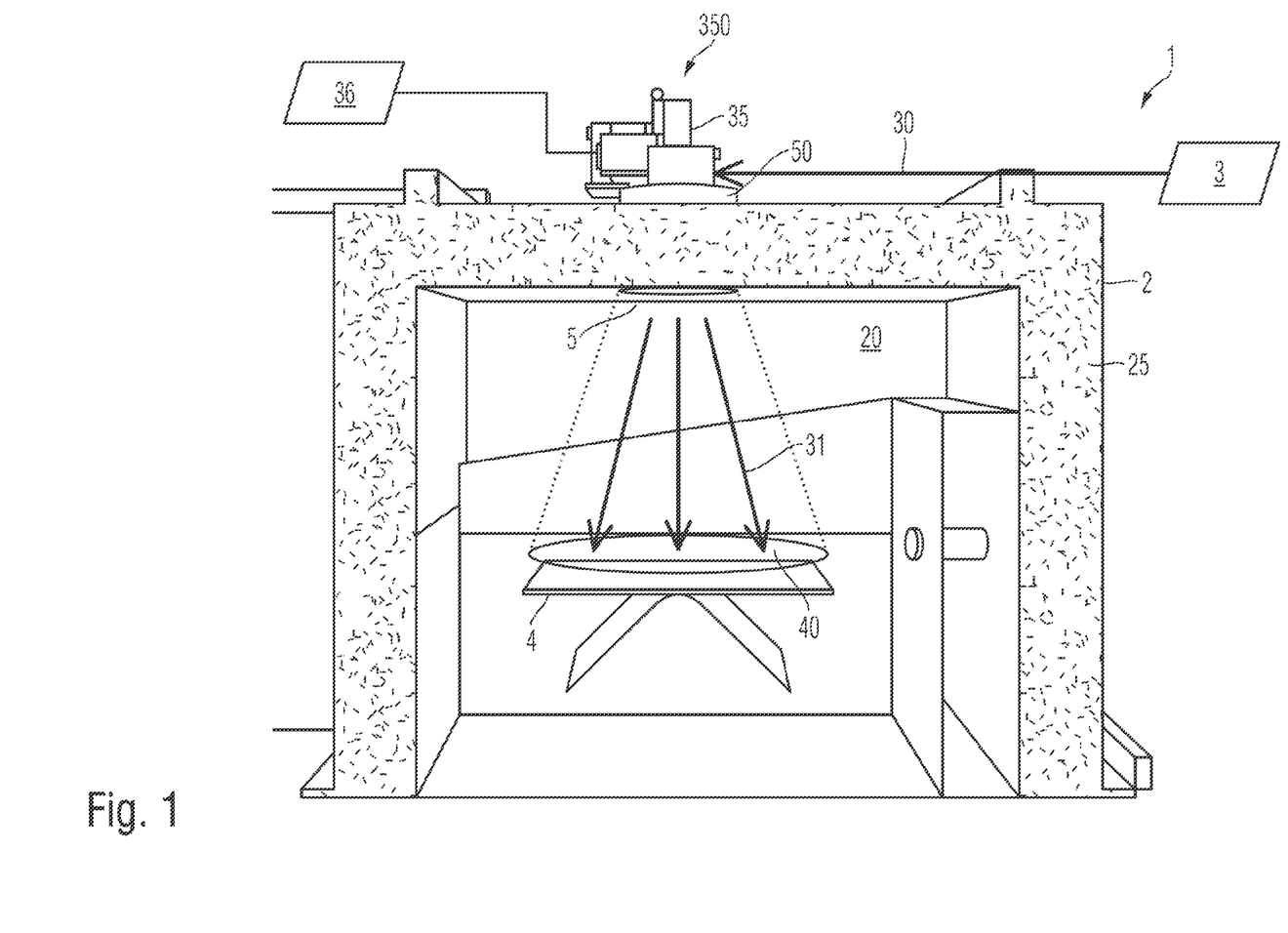
FIG. 1 shows a first embodiment of a device according to the invention.

FIG. 1 shows a first embodiment of a device according to the invention. The device comprises a furnace 2. The furnace 2 comprises a furnace chamber 20, which is surrounded by a wall 25. The wall can have thermal insulation in order to reduce heat losses to the surroundings. The material of the wall can comprise or consist of a metal or an alloy or a mineral material, such as fireclay or ceramics. A metal or an alloy may be provided with a heat-insulating coating comprising an oxide or a nitride, for example. In addition, the furnace 2 comprises heating units (not shown) being configured to heat the furnace chamber 20. In some embodiments of the invention, the temperature inside the furnace chamber 20 may be selected from about 400° C. to about 800° C. or from about 500° C. to about 700° C.

FIG. 1 further illustrates a semi-finished glass product 4. The semi-finished glass product may be a flat glass, for example. In other embodiments of the invention, the semi-finished glass product 4 may also have a different shape, for example be a cylinder, a sphere or have any other geometry.

An opening 5 is provided in the ceiling of the furnace chamber 20. The opening 5 may be closed by means of a movable gate valve to reduce or prevent heat losses resulting from hot air escaping from the furnace chamber 20. For this purpose, the movable gate valve may be made of or comprise a metal or an alloy or a mineral material. The gate valve can likewise be provided with a coating.

When the device is operated, the semi-finished glass product 4 is heated to a predetermined temperature below the glass transition temperature. In a subsequent method step, additional heat may be supplied to predetermined partial areas 40 of the semi-finished glass product 4. This is done by infrared radiation, which is directed to the desired partial areas 40.

In some embodiments, a laser 3 may be used to generate the infrared radiation. The laser may be a $CO_2$ laser in some embodiments of the invention. The laser 3 generates a laser beam 30. Laser beam 30 may have a power between about 100 W and about 5000 W or between about 1000 W and about 2500 W.

In the illustrated embodiment, the laser beam 30 is directed into the interior of the furnace chamber 20 by means of a scanner 350. The scanner 350 has a movable mirror 35, which may be moved and/or rotated by actuators as known to those skilled in the art. In some embodiments, piezo actuators and/or electric motors may be used to move and/or rotate the mirror 35. In some embodiments, the mirror 35 of the scanner 350 may be controlled by a computer system 36, having a computer program stored inside that is configured to influence the position of the laser beam 31 deflected at the mirror 35 and thus selects predetermined partial areas 40 of the semi-finished glass product 4.

In order to allow the laser beam 30 to reach the interior of the furnace chamber 20, an optional gate valve is removed from the opening 5. This can cause hot air escaping from the furnace chamber 20 through the opening 5. According to the invention it is suggested to provide at least one nozzle 50 to generate a sealing air flow. The nozzle 50 may be designed as a ring nozzle in an exemplary embodiment. The sealing air flow generated by the nozzle 50 counteracts the air flow rising by convection, so that the escape of hot air from the furnace chamber 20 is at least reduced or may be completely prevented. This feature may have the advantage that the scanner 350 is exposed to a lower thermal load. In addition, the energy consumption for heating the furnace 2 may be reduced and/or the temperature distribution of the semi-finished glass product 4 may be more uniform.

Although FIG. 1 only shows a single opening 5 with a single scanner 350, some embodiments of the invention may have a furnace 2 with a plurality of openings 5 each opening 5 having associated lasers and scanners 350. This feature may have the technical effect that the area of the semi-finished glass product 4 being covered by a plurality of deflected laser beams 31 may be enlarged, so that even large semi-finished glass products may be re-shaped, for example truck windows or architectural glass.

Figure 2:
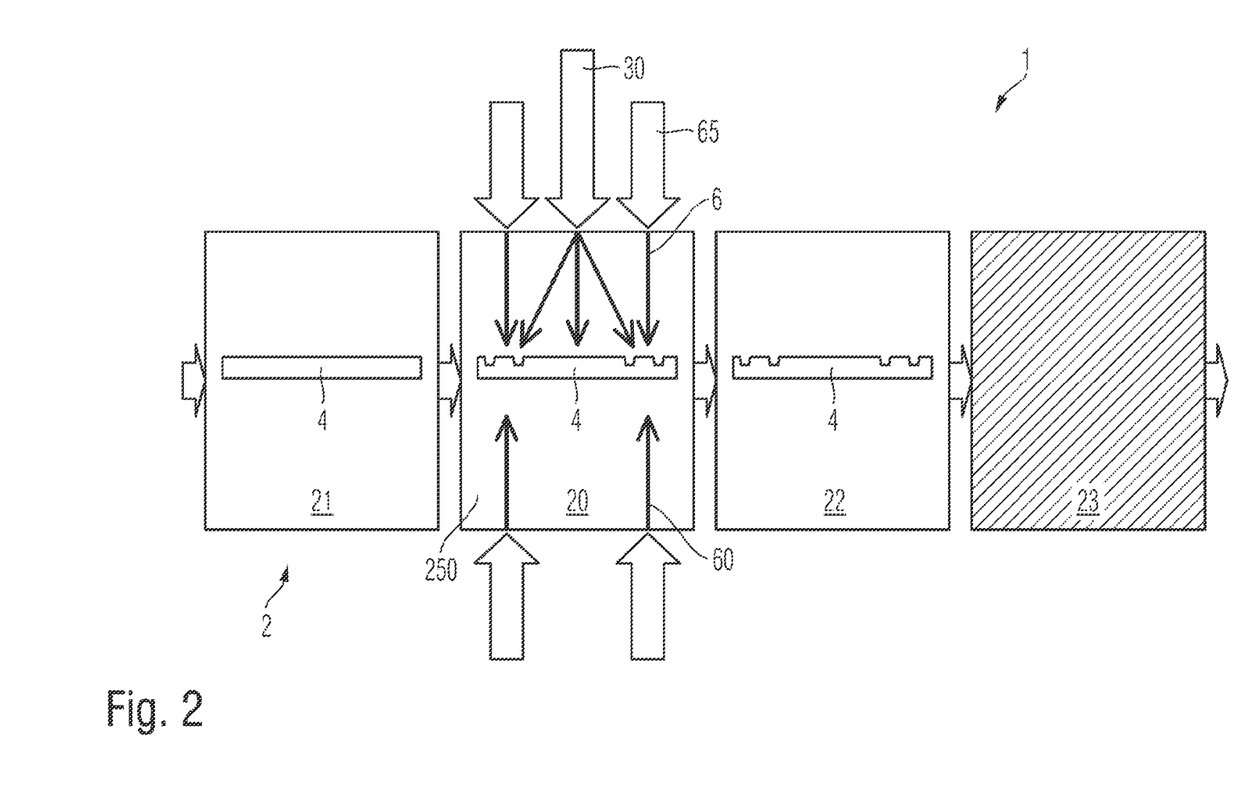
FIG. 2 shows a schematic diagram of a second embodiment of a device according to the invention.

FIG. 2 shows a second embodiment of the invention. Like features are denoted with like reference numbers, so that the following description may be restricted to the main differences. FIG. 2 shows a device 1 comprising a furnace 2. The furnace 2 has a plurality of furnace chambers 20, 21, 22 and 23. The furnace chambers are arranged relative to one another in such a way that a semi-finished glass product 4, which starts from the first furnace chamber 2, can pass continuously and sequentially through the other furnace chambers 20, 22 and 23. The furnace chambers may be kept at different temperatures so that the semi-finished glass product 4 undergoes different processing in each furnace chamber. The individual furnace chambers do not have to be structurally separate in all embodiments. In some embodiments of the invention, a single furnace chamber may be divided into different functional zones having different temperatures so that each zone forms one of the furnace chambers 20, 21, 22 and 23.

In the first furnace chamber 21, the semi-finished glass product 4 may be preheated. For this purpose, the furnace chamber may have a temperature between 250° C. and about 550° C. or between about 400° and about 500°.

The semi-finished glass product 4 is then transferred to the second furnace chamber 20. This chamber may be at a temperature between about 400° and about 600°. The re-shaping may be carried out by local heating using infrared radiation, as described above in connection with FIG. 1. In particular, laser radiation 30 may be used.

Alternatively or additionally, embossing dies 6 may be used, which emboss and thus reform the semi-finished glass products 4 at predetermined parts of the surface. For this purpose, the embossing dies 6 may be moved by actuators 65, for example push rods, pneumatic actuators, piezo actuators or other actuators known in the art. The embossing dies 6 may be preheated to a working temperature which is above the temperature of the semi-finished glass product 4 and/or above the temperature of the furnace chamber 20. For this purpose, the embossing dies 6 may be arranged in a part 250 of the furnace chamber 20, having a different temperature than the remaining parts of the furnace chamber 20 accommodating the semi-finished glass product 4. For example, the partial volume 250 can comprise additional heating units which may be selected from infrared radiators or resistance heaters. In other embodiments of the invention, the embossing dies 6 may be equipped with electric heating units.

In some embodiments of the invention, complementarily shaped counter embossing dies 60 may be disposed opposite the embossing dies 5. In this way, an unwanted deformation of the semi-finished glass product 4 under the action of the embossing die 5 may be avoided by applying an opposite force by the counter embossing die 6. Alternatively, the counter embossing die 6 may be configured to give the side of the semi-finished glass product 4 that is opposite the embossing die 5 a desired complementary shape.

After re-shaping has taken place, the semi-finished glass product 4 may be fed into a third furnace chamber 22, which, in turn, may have a temperature that differs from that of the preceding second furnace chamber 20. For example, the temperature of the third furnace chamber 22 may be between the temperature of the first furnace chamber 21 and the temperature of the second furnace chamber 20. In some embodiments of the invention, the temperature of the second furnace chamber 20 may be between about 200° and about 500° or between about 300° and about 400°.

By storing the semi-finished glass product 4 in the third furnace chamber 22, the semi-finished glass product 4 may be cooled in a controlled way so that mechanical stress within the semi-finished glass product 4 is reduced. While the semi-finished glass product 4 undergoes a controlled cooling in the third furnace chamber 22, another semi-finished glass product may be re-shaped in the second furnace chamber 20 and a third semi-finished glass product 4 may be preheated in the first furnace chamber 21. Due to the continuous passage of the semi-finished glass products 4 through the furnace chambers 21, 20 and 22, the cycle time may be reduced and the throughput of the device 1 may be increased.

In the optional fourth furnace chamber 23, an optional shock cooling of the semi-finished glass product 4 may be carried out at a comparatively low temperature. In this way, for example, a glass article may be produced from tempered glass which, on the one hand, has a hardened surface and therefore becomes more resistant and, on the other hand, has a different fracture behavior, so that the occurrence of large, sharp-edged fragments is avoided. For this purpose, the fourth furnace chamber 23 can have a temperature between about −50° C. and 100° C., so that the semi-finished glass product may be rapidly cooled to a temperature below 350° C. However, it should be noted that the fourth furnace chamber 23 is optional and may be omitted in other embodiments of the invention. If the fourth furnace chamber 23 is used, the above described third furnace chamber 22 can have a temperature between about 650° C. and about 750° C. in preparation for thermal tempering.

In some embodiments of the invention, the device according to the invention may have a transport pallet and/or a mold being configured to move the semi-finished glass product inside the furnace chamber 20 and/or between a plurality of furnace chambers. In some embodiments of the invention, this transport pallet or mold has three contact points, said contact points configured to be positioned onto corresponding receiving devices of the furnace chamber in an interlocking manner. This allows a reproducible positioning so that the semi-finished glass product 4 is always positioned in the same relative position to the scanner 350 and/or to the embossing die 6. Thus, the same partial surfaces of the semi-finished glass product 4 are heated and/or re-shaped with high accuracy.

Figure 3:
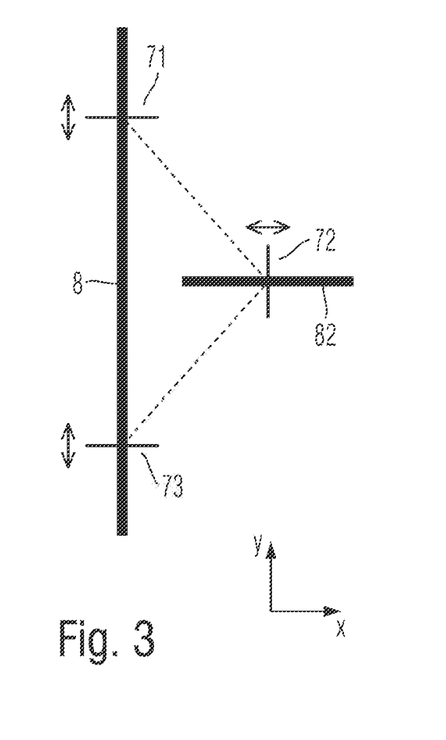
FIG. 3 explains the positioning of the semi-finished glass product in a first embodiment.

FIG. 3 shows a first embodiment of the contact points 71, 72 and 73 of a transport pallet. As further detailed in FIG. 6 below, the contact points 71, 72 and 73 are designed in such a way that they may be positioned exactly in two directions and may be movable in the third direction.

As an example, the corresponding receiving devices 8 of the furnace chamber may be made from a polygonal or round tube or rod. Thus, an elongated receiving device is provided to accommodate the contact points 71 and 73. These allow the transport pallet equipped with contact points 71 and 73 to be fixed in the X direction and being movable in the Y direction.

The further receiving device 82 for the contact point 72 is not arranged parallel to the first receiving device. In some embodiments of the invention, the receiving devices 8 and 82 can enclose an angle of about 60° to about 120° or about 90°. The receiving device 82 allows the second contact point 72 to be moved in the X direction and fixed in the Y direction. Thus, transport pallets may be received in the furnace and positioned clearly by the interaction of the three contact points. However, transport pallets of different sizes can have different distances between the first and third contact points 71 and 72 and a different distance of the second contact point 72 from the connecting line of these first and third contact points. This allows the positioning of different transport pallets and/or molds, so that different products may be manufactures without any conversion work in the furnace chamber. Cooling of the furnace for production changeover may therefore be avoided.

Since the transport pallet is not firmly clamped at the contact points but is movable in the X and Y direction, even temperature changes, which are unavoidable when a cold semi-finished glass product on a cold transport pallet is placed in the heated furnace, cannot lead to the occurrence of mechanical stress which could endanger the dimensional accuracy of the glass component and/or lead to mechanical damage to the transport pallet and/or the furnace.

The transport pallets or the molds can rest by gravity on the receiving devices in the furnace chamber and can thus also be positioned in a clearly defined manner in the spatial direction Z orthogonal to the illustrated X and Y direction. In one embodiment of the invention, the center of gravity of the transport pallet and/or the mold may be located within the triangle defined by the contact points 71, 72 and 73. This ensures stable positioning of the transport pallet within the furnace.

Figure 4:
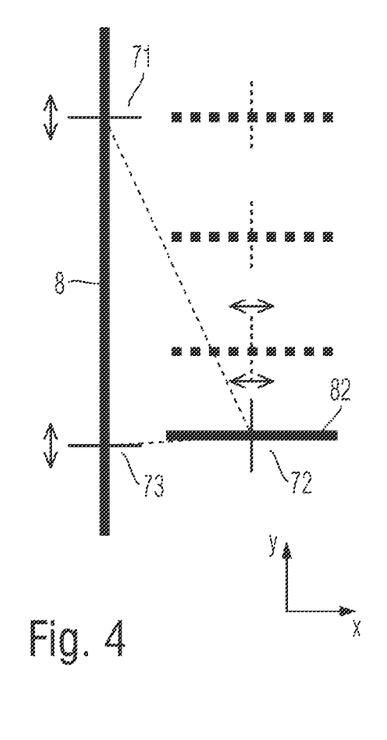
FIG. 4 explains the positioning of the semi-finished glass product in a second embodiment.

FIG. 4 shows a second embodiment of the positioning unit according to the invention. Like parts of the invention are denoted with like reference numerals, so that the following description may be limited to the main differences.

As shown in FIG. 4, the receiving device 82 for the second contact point 72 is designed to be movable parallel to the receiving device 8, so that the angular relationship to the first receiving device of the contact points 71 and 73 remains unchanged. However, the receiving device 82 may be moved in a direction parallel to the first receiving device 8, so that either an adaptation to different transport pallets may be made and/or the transport pallet may be positioned and/or transported within the furnace by moving the receiving device 82. For the purpose of illustrating this feature, four possible positions of the second receiving device 82 are shown.

Figure 5:
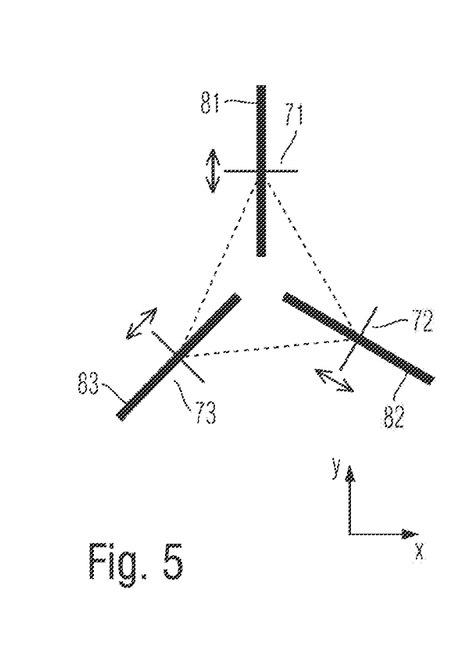
FIG. 5 explains the positioning of the semi-finished glass product in a third embodiment.

FIG. 5 shows a third embodiment of the positioning unit according to the invention. Like parts of the invention are denoted with like reference numerals, so that the following description may be limited to the main differences.

The third embodiment uses three receiving devices, 81, 82 and 83 arranged within the furnace chamber 20, which each engage in corresponding contact points 71, 72 and 73. The three receiving devices are again designed as elongated elements, which may have a polygonal or round cross-section, for example.

The longitudinal axes of the receiving devices enclose an angle of 120° relative to each other. Due to the longitudinal extension, transport pallets and/or molds of different sizes or with different distances between the receiving devices may be received without the need for conversion work. Nevertheless, the positioning unit allows a reproducible positional relationship of the transport pallet equipped therewith to the other units of the furnace, for example a scanner 350. This constant positional relationship includes both angle and location.

Figure 6:
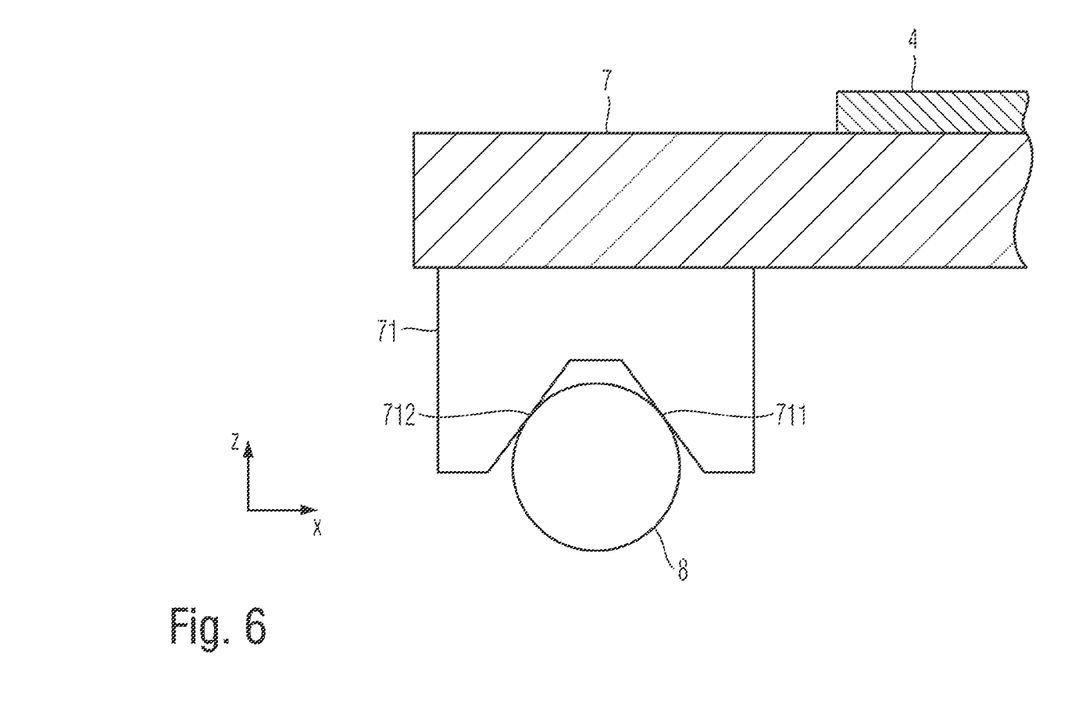
FIG. 6 shows a positioning aid of a transport pallet.

FIG. 6 shows a cross section of a segment of a transport pallet 7 with a contact point 71 and a receiving device 8. In the illustrated, highly simplified exemplary embodiment, the transport pallet 7 is a plane-parallel plate comprising a metal or an alloy or a ceramic material, for example. Optionally, the transport pallet 7 may be provided with a coating (not shown) which prevents the semi-finished glass product 4 from sticking and/or increases the temperature resistance.

On the side of the transport pallet 7 that is opposite the semi-finished glass product 4, a contact point 71 is shown, which has a polygonal cross-section. The illustrated cross-section is obtained by inserting an approximately V-shaped groove into a cuboid base body. The groove may have a flattened base.

The corresponding receiving device 8 comprises a rod or tube with an approximately circular outer cross-section. Due to the weight of the transport pallet 7, the V-shaped groove of the contact point 71 lies on the receiving device 8 in such a way that it rests on two dedicated contact points or contact lines 711 and 712. This results in a defined positioning in both the X direction and the Z direction which is orthogonal thereto.

In cooperation with other receiving devices and contact points, precise positioning can thus be achieved in all three directions and all three directions of rotation, as explained above with reference to the FIGS. 3 to 5.

Figure 7:
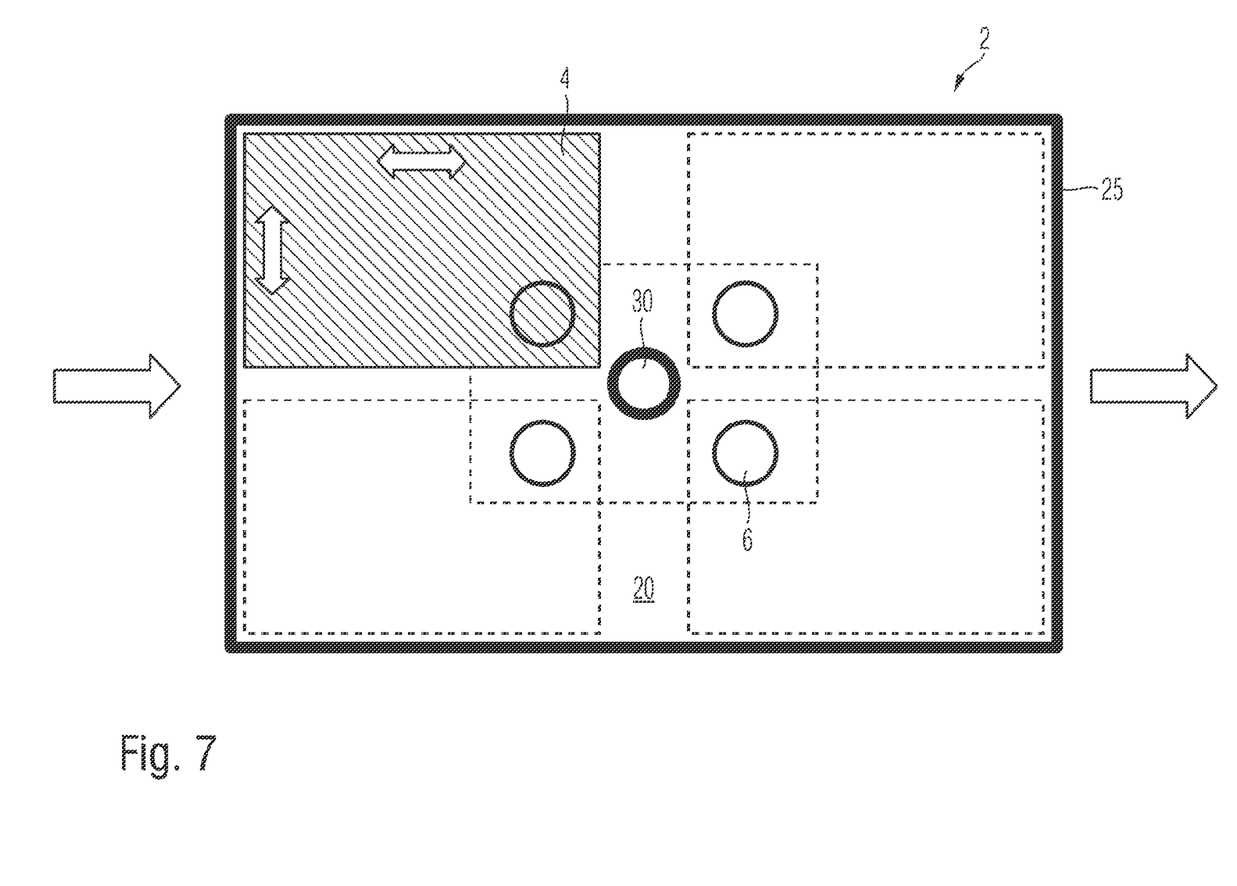
FIG. 7 shows the top view of a third embodiment of a device according to the invention.

FIG. 7 shows the top view on a furnace chamber 20, which is delimited by a wall 25. Inside the furnace chamber 20, four embossing dies 6 are located, which are arranged in a rectangular array concentrically around the target point of a laser beam 30.

FIG. 7 illustrates further a semi-finished glass product 4 having an approximately rectangular shape. The semi-finished glass product 4 may be moved within the furnace chamber 20. Five possible positions are indicated in FIG. 7. As will be understood, the semi-finished glass product 4 may be brought, for example, into a position allowing all four embossing dies 6 to act simultaneously or sequentially on the semi-finished glass product 4, thereby reaching any point of the semi-finished glass product. In other embodiments of the invention, the semi-finished glass product 4 may be moved under the laser beam 30 in such a way that predetermined partial surfaces are sequentially heated by the laser beam 30 in order to re-shape the glass product. Due to the movement of the semi-finished glass product 4 within the furnace 2, the use of a scanner 350 may be avoided and a relative movement between the laser beam 30 and the semi-finished glass product 4 can nevertheless be realized.

Figure 8:
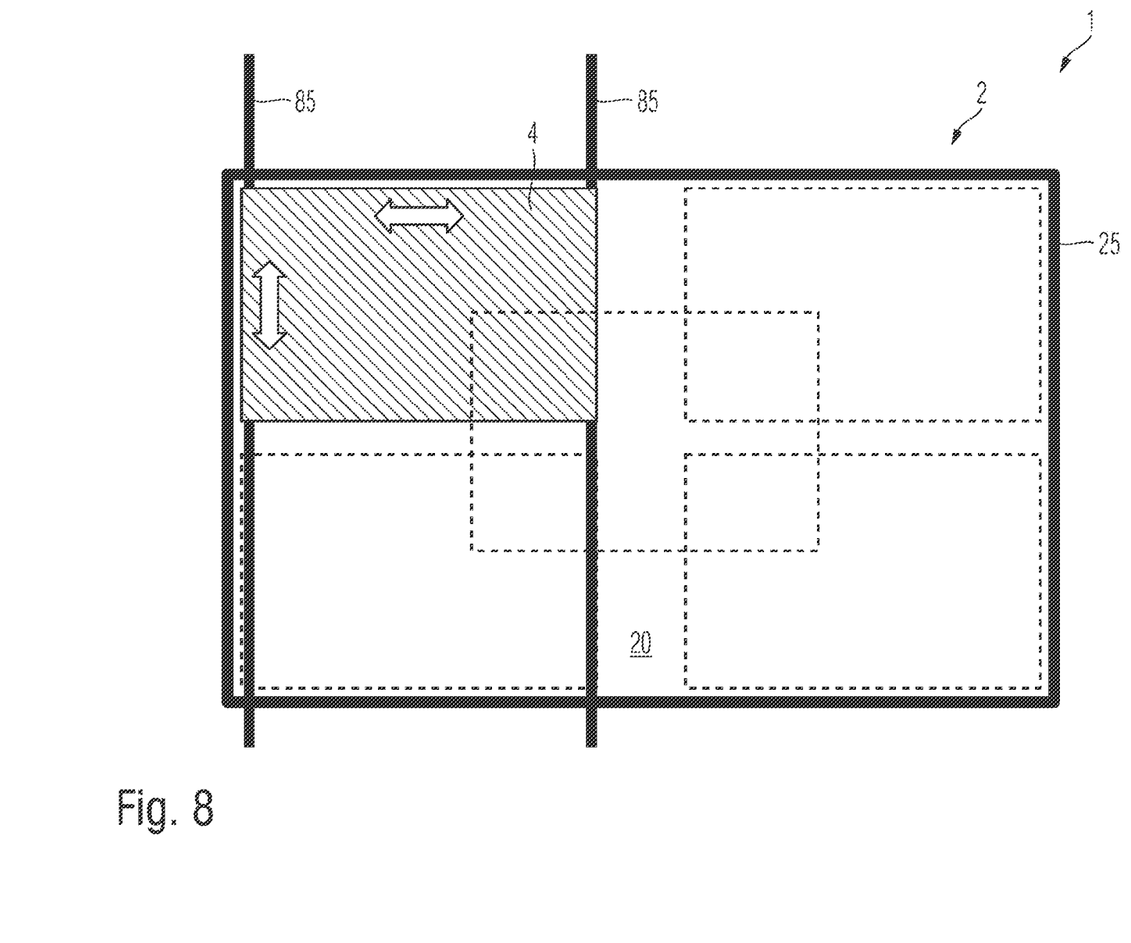
FIG. 8 shows a further view of the third embodiment of a device according to the invention.

FIG. 8 shows a further view of a furnace 2 as part of a device 1 according to the present invention.

FIG. 8 illustrates a top view of the bottom of a furnace chamber 20 of a furnace 2, which is delimited by a wall 25. FIG. 8 illustrates a mechanism configured to move the semi-finished glass product 4 within the furnace chamber 20. It consists of two receiving devices 85, which are arranged approximately parallel to each other. These receiving devices may be moved in two axes so that the semi-finished glass product 4 may be positioned within the furnace chamber 20. This feature allows the semi-finished glass product 4 to be moved into the operational range of the embossing dies 6 and/or a laser beam (not shown in FIG. 8). The semi-finished glass product may also be moved to different temperature zones, e.g. to carry out optional method steps of preheating, re-shaping or tempering.

Figure 9:
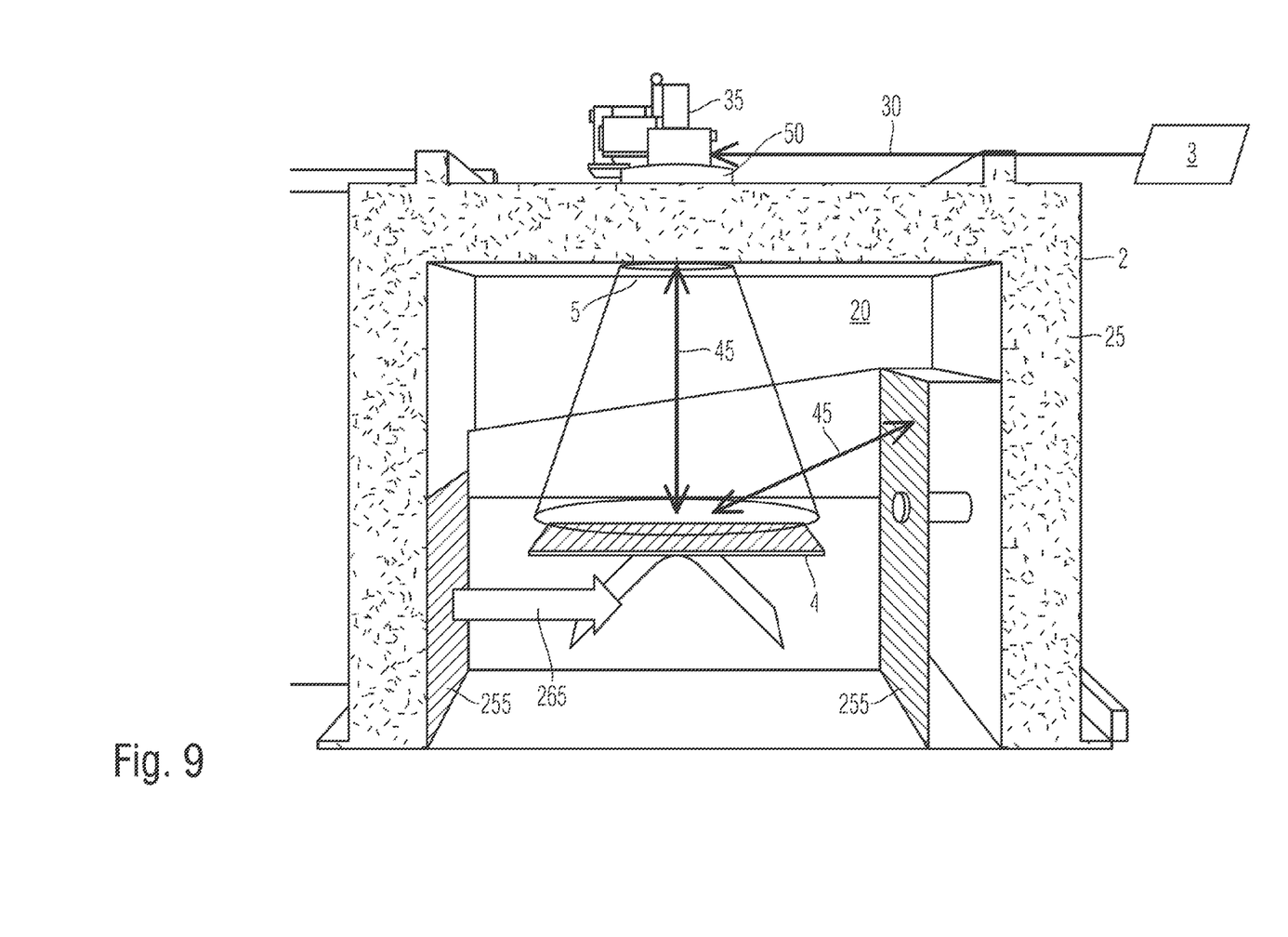
FIG. 9 shows the cross-section of a fourth embodiment of a device according to the invention.

FIG. 9 illustrates a cross-section through a furnace 2 according to a fourth embodiment of the invention. Like parts of the invention are denoted with like reference numerals, so that the following description may be limited to the main differences.

Again, a furnace chamber 20 is shown, in which a semi-finished glass product 4 is accommodated. The furnace 2 is designed as a circulating air furnace, i.e. a heating unit (not shown) heats the furnace air and feeds it to the furnace chamber 20 as an air flow 265 by means of a blower unit. The air flow 265 may allow for a more homogeneous and uniform heating of the semi-finished glass product 4.

Additionally, a line of sight 45 between individual partial areas of the semi-finished glass product 4 and the furnace walls 25 exists. This results in an additional exchange of radiant heat between the semi-finished glass product 4 and the wall 25 of the furnace chamber 20. Of course, the two lines of sight 45 illustrated in the figure are only to be understood as exemplary. In fact, there is a plurality of such lines of sight between individual partial areas of the semi-finished glass product 4 and respectively associated partial areas of the wall 24 of the furnace chamber 20.

If the wall 25 has a lower temperature than the semi-finished glass product in the furnace chamber 20, the exchange of radiant heat leads to a cooling of the semi-finished glass product 4. This may prevent a homogeneous heating of the semi-finished glass product 4.

According to the invention, it is suggested to place at least one sheet metal heat deflectors 255 inside the furnace chamber 20, which may be brought to a higher temperature than the wall. The sheet metal heat deflectors 255 may be heated, for example, by additional electric or gas-operated heating units. In other embodiments of the invention, the hot air flow 265 may be used for rear ventilation of a sheet metal heat deflector, so that they can absorb heat from the hot air flow 265. In this way it may be ensured that the half-space surrounding the semi-finished glass product 4 exchanges radiant heat evenly with the semi-finished glass product, so that non-homogeneous cooling or heating of the semi-finished glass product 4 is avoided. Thus, it is possible to get a better control of the temperature distribution of the semi-finished glass product 4 due to the controlled exchange of radiation between the semi-finished glass product and the inner walls of the furnace chamber. In some embodiments of the invention, all sheet metal heat deflectors 255 inside the furnace chamber 20 may have the same temperature. In some embodiments of the invention, this temperature may be equal to the temperature of the air in the furnace chamber 20.

It is noted that, the invention is not limited to the illustrated embodiments. The above description should not be regarded as restrictive but as explanatory. The following claims are to be understood in such a way that a cited feature is present in at least one embodiment of the invention. This does not exclude the presence of further features. Insofar as the claims and the above description define "first" and "second" embodiments, this designation serves to distinguish between two similar embodiments without determining an order.

What is claimed is:

1. Device (1) comprising:
    a furnace (2) having at least one furnace chamber (20) adapted to receive a semi-finished glass product (4),
    a wall (25) delimiting the at least one furnace chamber (20), the wall having at least one opening (5) formed in a material-free manner in the form of a simple hole, the at least opening provided with at least one nozzle (50) adapted to generate a sealing air flow to reduce heat losses of the furnace chamber (20) through the hole; and
    a radiation source or radiation detector positioned outside the at least one furnace chamber and configured to supply or receive electromagnetic radiation through the at least one opening;
    wherein:
    the radiation source comprises at least one laser (3) configured to generate a laser beam (30); and
    the device is configured to direct the laser beam onto one or more predetermined partial areas (40) of the semi-finished glass product (4).

2. Device according to claim 1, wherein the at least one nozzle (50) is a ring nozzle.

3. Device according to claim 1, wherein the furnace (2) has a plurality of furnace chambers which are configured to be passed through sequentially by the semi-finished glass product (4), each furnace chamber configured to be brought to a different temperature.

4. Device according to claim 1, wherein the radiation detector comprises at least one thermal camera, configured to determine temperature variation on a surface of the semi-finished glass product (4).

5. Device according to claim 1, further comprising at least one embossing die (6) configured to re-shape the semi-finished glass product (4).

6. Device according to claim 5, wherein:
    the at least one embossing die is located in a partial volume (250) of the at least one furnace chamber (20), and
    the device is configured to control temperature in the at least one furnace chamber (20) such that a temperature of the partial volume (250) differs from a temperature of the remaining volume within the at least one furnace chamber (20).

7. Device according to claim 5, wherein a complementarily shaped counter embossing die (60) is arranged opposite the at least one embossing die (6).

8. Device according to claim 1, further comprising at least one movable mirror (35) configured to direct the laser beam onto said one or more predetermined partial areas (40) of the semi-finished glass product (4).

9. Device according to claim 1, further comprising a transport pallet (7) having three contact points (71, 72, 73) which define a triangle and are configured to be received in an interlocking fashion in associated receiving devices (8) of the at least one furnace chamber (20).

10. Device according to claim 9, wherein the transport pallet has a center of gravity located within the triangle defined by the three contact points.

11. Device according to claim 9, wherein the contact points have a V-shaped support body and the receiving devices have a round outer cross-section.

12. Device according to claim 9, wherein one of the receiving devices of the at least one furnace chamber receives a plurality of contact points.

13. Device according to claim 1, wherein the furnace has at least one air circulation system configured to circulate air in the at least one furnace chamber.

14. Device according to claim 1, wherein the furnace comprises at least one sheet metal heat deflector which is arranged inside the at least one furnace chamber and covers at least part of the wall, the at least one sheet metal heat deflector having a line of sight to the semi-finished glass product.

15. Device according to claim 14, wherein the furnace comprises at least one heating unit configured to bring the at least one sheet metal heat deflector to a predetermined temperature.

16. Device according to claim 14, wherein:
    the furnace has at least one air circulation system configured to circulate air in the at least one furnace chamber; and
    the at least one air circulation system is configured to generate an air flow which flows behind at least part of the at least one sheet metal heat deflector.

17. Device according to claim 1, comprising at least one positioning system configured to move the semi-finished glass product about at least one axis, within the at least one furnace chamber.

18. Device according to claim 1, comprising at least one positioning system configured to rotate the semi-finished glass product about at least one axis, within the at least one furnace chamber.

19. A furnace (2) configured to accommodate a semi-finished glass product (4), the furnace comprising:
    at least one furnace chamber (20) delimited by a wall (25);
    at least one opening (5) formed in a ceiling of the at least one furnace chamber (20);
    at least one laser (3) configured to generate a laser beam (30);
    at least one movable mirror (35) configured to direct the laser beam onto one or more predetermined partial areas (40) of the semi-finished glass product (4);
    a ring nozzle positioned at the at least one opening and configured to create a sealing air flow to promote heat retention in the at least one furnace chamber; and a transport pallet (7) having three contact points (71, 72, 73) which define a triangle and are configured to be received in an interlocking fashion in associated receiving devices (8) of the at least one furnace chamber (20).

20. The furnace (2) according to claim 19, further comprising:
   at least one positioning system configured to rotate the semi-finished glass product about at least one axis, within the at least one furnace chamber.

21. The furnace (2) according to claim 20, further comprising:
   at least one embossing die (6) arranged on one side of a semi-finished glass product (4) located in the at least one furnace chamber; and
   at least one complementarily shaped counter embossing die (60) arranged on an opposite side of the semi-finished glass product (4).

22. The furnace (2) according to claim 19, further comprising:
   at least one sheet metal heat deflector which is arranged inside the at least one furnace chamber and covers at least part of the wall, the at least one sheet metal heat deflector having a line of sight to the semi-finished glass product.

23. Device (1) comprising:
   a furnace (2) having at least one furnace chamber (20) adapted to receive a semi-finished glass product (4);
   a wall (25) delimiting the at least one furnace chamber (20), the wall having at least one opening (5) formed in a material-free manner in the form of a simple hole, the at least opening provided with at least one nozzle (50) adapted to generate a sealing air flow to reduce heat losses of the furnace chamber (20) through the hole;
   a radiation source or radiation detector positioned outside the at least one furnace chamber and configured to supply or receive electromagnetic radiation through the at least one opening; and
   at least one embossing die (6) configured to re-shape the semi-finished glass product (4).

24. Device (1) comprising:
   a furnace (2) having at least one furnace chamber (20) adapted to receive a semi-finished glass product (4);
   a wall (25) delimiting the at least one furnace chamber (20), the wall having at least one opening (5) formed in a material-free manner in the form of a simple hole, the at least opening provided with at least one nozzle (50) adapted to generate a sealing air flow to reduce heat losses of the furnace chamber (20) through the hole;
   a radiation source or radiation detector positioned outside the at least one furnace chamber and configured to supply or receive electromagnetic radiation through the at least one opening;
   wherein the furnace comprises:
      at least one sheet metal heat deflector which is arranged inside the at least one furnace chamber and covers at least part of the wall, the at least one sheet metal heat deflector having a line of sight to the semi-finished glass product; and
      at least one heating unit configured to bring the at least one sheet metal heat deflector to a predetermined temperature.

* * * * *